(No Model.)

W. BUCKLEY.
PACKING FOR PISTONS.

No. 526,682. Patented Oct. 2, 1894.

WITNESSES

INVENTOR
William Buckley

UNITED STATES PATENT OFFICE.

WILLIAM BUCKLEY, OF SHEFFIELD, ENGLAND.

PACKING FOR PISTONS.

SPECIFICATION forming part of Letters Patent No. 526,682, dated October 2, 1894.

Application filed August 1, 1893. Serial No. 482,116. (No model.) Patented in England July 14, 1892, No. 12,904, and in France September 19, 1892, No. 224,420.

*To all whom it may concern:*

Be it known that I, WILLIAM BUCKLEY, a subject of the Queen of Great Britain and Ireland, and a resident of Sheffield, in the county of York, England, have invented certain Improved Packing for Pistons, (for which I have obtained British Patent No. 12,904, dated July 14, 1892, and French Patent No. 224,420, dated September 19, 1892,) of which the following is a specification.

This invention relates to the packing devices of pistons, piston rod glands and analogous apparatus, and it consists in an improved construction of spring-ring combining the several features of being of a helically coiled formation with reference to its annular axis, with the coils in close adjacency, and with two opposite sides thereof flattened in parallel relation to each other, and of being of a dished or truncated conical formation in relation to the axis of the piston, so as to be adapted to act with a short and powerful annular leverage exerting its pressure equally at all parts of its periphery, with the facility of its axial and diametrical actions being respectively adjustable without affecting the other; whereby the spring-ring is especially adapted for use, conjunctively with rectangularly flanged packing-rings in the packing devices of the aforesaid parts of engines worked at high-pressure.

Figure 1:
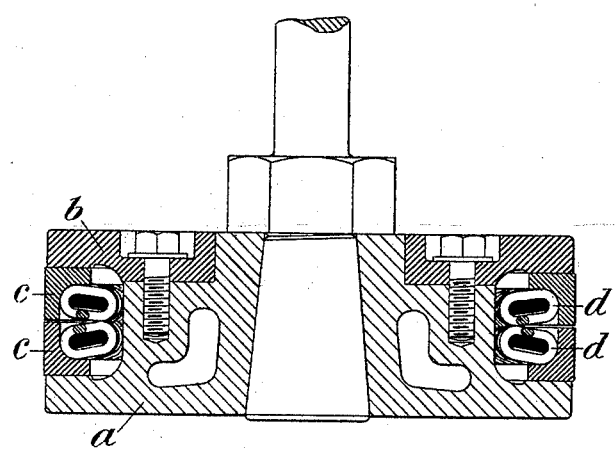
Figure 2:
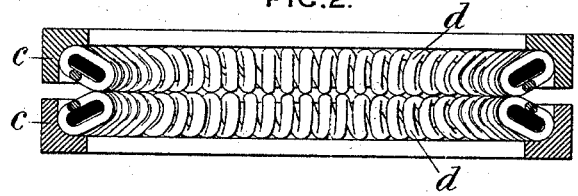
Figure 3:
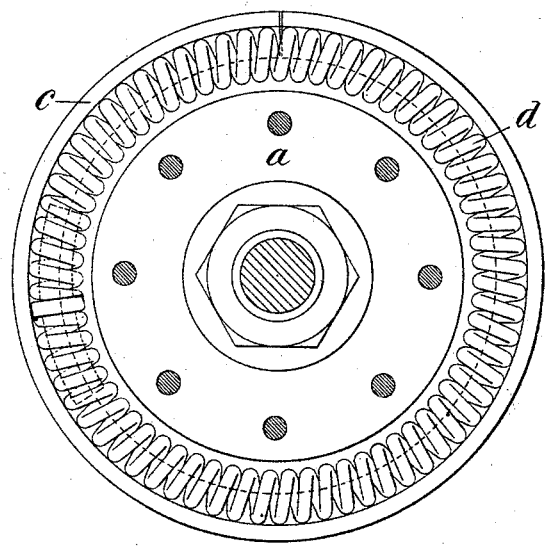

On the accompanying drawings—Figure 1, represents a sectional elevation of a piston fitted with rectangularly flanged packing-rings and with the improved spring-rings. Fig. 2, represents a sectional elevation of the packing-rings and spring-rings removed from the piston; and Fig. 3, represents a plan of the piston-block with the lower packing-ring and spring-ring in position.

*a*, represents the piston-block, *b*, the piston-cover or junk-ring, and *c*, the rectangularly flanged packing rings.

*d*, represents the improved spring-ring, which combines in its construction the several features of being of a helically coiled formation with reference to its annular axis, with the coils in close adjacency, and with two opposite sides thereof flattened in parallel relation to each other, and of being of a dished or truncated conical formation in relation to the axis of the piston, so as to be adapted to act with a short and powerful annular leverage exerting its pressure equally at all parts of its periphery, with the facility of its axial and diametrical actions being respectively adjustable without affecting the other. Such peculiar formation of the spring-ring renders it especially applicable for use, conjunctively with rectangularly flanged packing-rings, in the packing devices of pistons and the like parts of engines worked at high-pressure, as, in such packing devices, an effective radial force, commensurate with the pressure of the steam working the engine, is one essential requirement, in order to cause the packing-rings to be maintained in steam-tight contact with the cylinder walls, and, in such packing devices, an equally effective axial pressure is another essential requirement, in order to cause the packing-rings to be maintained tight against the piston block and cover respectively, so as to prevent the frictional contact of the packing-rings against the cylinder walls from causing any clattering together of the packing rings or any axial movement thereof relatively to and against the piston block and cover, which axial movements are liable to cause fracture of such rings.

Spring-rings usefully applicable to engines worked at low-pressures are not capable of exerting the above requirements in any degree sufficient to render them practically available for use in engines worked at high-pressures, and, consequently, separate spring-rings for separately effecting the desired radial and axial pressures are ordinarily used in such engines.

I am aware that it has been proposed to use one and the same spring-ring spirally coiled with reference to the axis of the piston and operating both axially and radially against the inner surface of a surrounding packing-ring, and also to use one and the same spring-ring of a dished and annularly corrugated formation supported adjacent to the piston rod and similarly acting both axially and radially; but such spring rings are,—(on account of their excessively long leverage, from their point of support, to the point of applying their force, due to the spiral formation of the former about the axis of the piston, and to the central support and annularly corrugated formation of the latter,)—not of a construction suitable for practical use in the packing devices of pistons and the like parts of engines worked at high-pressures, as they would be wholly unable to exert the axial pressure necessary to prevent the aforesaid relative axial movement of the packing rings, or to avoid the consequent liability of fracture of the latter. Moreover, such spirally coiled and dished annularly corrugated spring-rings do not possess the faculty of their axial and radial pressures being respectively adjustable without affecting the other, which is a most desirable feature in spring rings used in the packing devices of high-pressure engines, in order to allow of such pressures being accommodated from time to time according to the wear of the packing-rings, which, with existing spring-rings, is frequently very excessive.

On account of their close helically coiled formation, the improved spring-rings are possessed of considerable strength and radially expansive force. On account of their flat-sided formation, they can be used with a narrow packing-ring, and permit of reduction of the depth of the piston;—and on account of their flattened formation conjunctively with their dished or truncated conical formation, they are possessed of a short and powerful leverage wholly around and equally at all parts of their circumference, their apices acting in abutment, and their bases acting in an axial direction against the flat parallel flanges of the packing-rings, pressing and maintaining them against the piston-block and cover respectively. The aforesaid peculiar construction of the spring-rings also permits of their axial separating action being adjusted, by more or less flattening their conicality, without appreciably affecting their radially expansive force, as, when compressed to a flattened condition, their basial diameter does not increase, but their apicial diameter decreases; and such construction also permits of the radially expansive action of the spring-rings being adjusted, by the insertion or removal of packing pieces between the meeting ends of the spring-ring, without, in any way, affecting the conicality or axial action thereof, the radial expansive action being wholly dependent upon the length of the spring-ring, and the axial action being wholly dependent on the conicality of the spring.

I claim as my invention—

1. A spring-ring for the packing devices of pistons, piston-rod glands and analogous apparatus, constructed of a helically coiled formation with reference to its annular axis, with the coils in close adjacency, and with two opposite sides thereof flattened in parallel relation to each other, and of a dished or truncated conical formation in relation to the axis of the piston, as set forth.

2. In packing devices of pistons, piston-rod glands and analogous apparatus, in combination, spring-rings each constructed of a helically coiled formation with reference to its annular axis, with the coils in close adjacency, and with two opposite sides thereof flattened in parallel relation to each other, and of a dished or truncated conical formation in relation to the axis of the piston, and rectangularly flanged packing-rings against which the spring-rings exert their axial and diametrical actions independently of each other when the packing rings are clamped together, as set forth.

In testimony whereof I have signed my name to this specification in the presence of two subscribing witnesses.

WILLIAM BUCKLEY.

Witnesses:
DAVID MORTON NICHOLSON,
THOMAS CADMAN SMITH.